US009668301B2

(12) United States Patent
Lim et al.

(10) Patent No.: US 9,668,301 B2
(45) Date of Patent: May 30, 2017

(54) WET-USE PLANE HEATER USING PTC CONSTANT HEATER-INK POLYMER

(71) Applicant: NDT ENGINEERING & AEROSPACE CO., LTD., Changwon-si (KR)

(72) Inventors: Ki Hyun Lim, Changwon-si (KR); Chi Woo Noh, Seoul (KR)

(73) Assignee: NDT ENGINEERING & AEROSPACE CO., LTD., Changwon-si (KR)

( * ) Notice: Subject to any disclaimer, the term of this patent is extended or adjusted under 35 U.S.C. 154(b) by 0 days.

(21) Appl. No.: 15/170,006

(22) Filed: Jun. 1, 2016

(65) Prior Publication Data

US 2017/0006664 A1 Jan. 5, 2017

Related U.S. Application Data

(63) Continuation of application No. PCT/KR2015/012614, filed on Nov. 24, 2015.

(30) Foreign Application Priority Data

Jul. 3, 2015 (KR) ........................ 10-2015-0095522

(51) Int. Cl.
*H05B 3/08* (2006.01)
*H05B 3/03* (2006.01)
(Continued)

(52) U.S. Cl.
CPC ................. *H05B 3/03* (2013.01); *H05B 3/04* (2013.01); *H05B 3/14* (2013.01); *H05B 3/20* (2013.01);
(Continued)

(58) Field of Classification Search
CPC ... H05B 3/03; H05B 3/04; H05B 3/20; H05B 3/14; H05B 2203/026; H05B 2203/02;
(Continued)

(56) References Cited

U.S. PATENT DOCUMENTS 3,317,657 A * 5/1967 Eisler ........................ H01B 7/08 156/291
3,608,627 A * 9/1971 Shevlin ................. A47J 39/006 165/206
(Continued)

FOREIGN PATENT DOCUMENTS

KR 100750707 8/2007
KR 20080079517 9/2008
(Continued)

*Primary Examiner* — Eric Stapleton
(74) *Attorney, Agent, or Firm* — Cantor Colburn LLP

(57) ABSTRACT

Provided is a wet-use plane heater using a positive temperature coefficient (PTC) constant heater-ink polymer, wherein the wet-use plane heater has unique characteristics in that it may not only be safe from the damage to the heater and the risk of fire due to self-temperature control characteristics, but a plane heater, which has been mainly installed in dry-use applications due to limitations of leakage current and induced current caused by an increase in contact area with an installation floor, may also be used for wet installation which uses a mortar.

7 Claims, 6 Drawing Sheets

(51) Int. Cl.
*H05B 3/04* (2006.01)
*H05B 3/14* (2006.01)
*H05B 3/20* (2006.01)

(52) U.S. Cl.
CPC .... *H05B 2203/02* (2013.01); *H05B 2203/026* (2013.01)

(58) Field of Classification Search
CPC .... H05B 3/845; H05B 3/86; H05B 2203/017; B60R 1/0602; C09J 7/0225; Y10T 428/24479; Y10T 428/14; Y10T 428/1476; Y10T 428/1486; Y10T 428/2486
USPC .... 219/219, 522, 528, 451.1, 541, 542–544, 219/548, 549, 468.1; 428/156, 202, 40.1, 428/41.8, 42.1
See application file for complete search history.

(56) References Cited

U.S. PATENT DOCUMENTS 3,718,535 A * 2/1973 Armstrong .............. B32B 17/10 156/102
3,878,362 A * 4/1975 Stinger ................... B32B 27/00 219/528
4,029,942 A * 6/1977 Levin ................ B32B 17/10036 174/261
4,100,398 A * 7/1978 Levin ...................... B32B 17/10 174/267
4,166,876 A * 9/1979 Chiba ..................... B60S 1/026 427/108
4,250,398 A * 2/1981 Ellis .......................... B32B 7/02 219/528
4,310,745 A * 1/1982 Bender .................... H05B 3/10 219/213
4,320,169 A * 3/1982 Yatabe .................... C03C 17/36 428/212
4,414,254 A * 11/1983 Iwata ....................... B05D 5/06 428/216
4,434,023 A * 2/1984 Kanamori ............. B29C 70/081 156/307.3
4,555,414 A * 11/1985 Hoover ................. H01L 21/702 257/E21.533
4,666,735 A * 5/1987 Hoover ................. H01L 21/702 257/E21.533
4,952,783 A * 8/1990 Aufderheide ...... G02B 27/0006 219/528
5,235,163 A * 8/1993 Levitan ................. B29C 33/026 219/469
5,493,102 A * 2/1996 Takase .................... B32B 17/10 219/203
5,560,796 A * 10/1996 Yoshimura ............ B44C 1/1716 156/240
5,911,899 A * 6/1999 Yoshikai .................. H05B 3/86 219/451.1
5,938,957 A * 8/1999 Tanahashi ............. B60R 1/0602 219/219
5,973,301 A * 10/1999 Inoue ..................... G02B 21/30 219/522
6,348,678 B1 * 2/2002 Loyd, Sr. ................ A61F 7/007 219/505
6,486,452 B2 * 11/2002 Loyd, Sr. ................ A61F 7/007 219/212
6,519,835 B1 * 2/2003 Von Arx ............. A47J 36/2483 219/528
7,488,523 B1 * 2/2009 Muncaster .............. B32B 11/04 404/17
7,745,838 B2 * 6/2010 Lefevre ............. B32B 17/10018 257/40
7,880,120 B2 * 2/2011 Schmidt ............ B32B 17/10036 219/203
8,008,606 B2 * 8/2011 Kaiserman ............... A43B 7/04 219/211
8,309,207 B2 * 11/2012 Kuiper ................... C09J 7/0225 428/156
8,405,009 B2 * 3/2013 Lim ........................ F25D 21/08 165/62
8,431,867 B2 * 4/2013 Blanchard ......... B32B 17/10036 219/203
8,431,871 B2 * 4/2013 Schmidt ............ B32B 17/10036 219/203
8,575,523 B2 * 11/2013 Chivers .................... H05B 3/34 219/213
8,580,367 B2 * 11/2013 Satake ...................... B32B 3/02 428/122
8,822,834 B2 * 9/2014 Inoue ................... H05K 1/0274 174/258
9,161,393 B2 * 10/2015 Kaiserman ........... A43B 3/0005
9,351,345 B2 * 5/2016 Aizawa .................... H05B 3/34
9,408,295 B2 * 8/2016 Yano ....................... H01L 33/62
9,425,451 B2 * 8/2016 Yeh ..................... H01M 2/1653
2002/0047007 A1 * 4/2002 Loyd, Sr. ................ A61F 7/007 219/530
2003/0183620 A1 * 10/2003 Wong ....................... H05B 3/34 219/549
2008/0083720 A1 * 4/2008 Gentile ................ A43B 3/0005 219/211
2008/0083721 A1 * 4/2008 Kaiserman ........... A43B 3/0005 219/211
2008/0083740 A1 * 4/2008 Kaiserman ............... A43B 7/04 219/520
2009/0008142 A1 * 1/2009 Shimizu .................... B32B 5/18 174/261
2009/0266810 A1 * 10/2009 Chivers .................... H05B 3/34 219/542
2010/0270280 A1 * 10/2010 Blanchard ......... B32B 17/10036 219/203
2011/0073586 A1 * 3/2011 Lim ........................ F25D 21/08 219/546
2012/0270036 A1 * 10/2012 Kiuchi ................... C09J 7/0217 428/336
2013/0153559 A1 * 6/2013 Choi ........................ H05B 3/84 219/203
2013/0292373 A1 * 11/2013 Choi ........................ H05B 3/84 219/522
2014/0190957 A1 * 7/2014 Chivers .................... H05B 3/34 219/528
2014/0197157 A1 * 7/2014 Aizawa .................... H05B 3/34 219/553
2015/0346408 A1 * 12/2015 Mizutani ............... C08F 220/18 428/41.5

FOREIGN PATENT DOCUMENTS

KR 20110068620 6/2011
KR 101128033 4/2012
KR 101168906 8/2012
KR 20140005649 1/2014

* cited by examiner

PARTIALLY LAMINATED COPPER PLATE PATTERN DESIGN #1: METHOD OF COATING ADHESIVE IN LARGE RHOMBUS CELL PATTERN (PARTIALLY LAMINATED COPPER PLATE PATTERN DESIGN #2: METHOD OF COATING ADHESIVE IN SMALL RHOMBUS CELL PATTERN)

(PARTIALLY LAMINATED COPPER PLATE PATTERN DESIGN #3: METHOD OF COATING ADHESIVE IN LONGITUDINAL CELL PATTERN)

WET-USE PLANE HEATER USING PTC CONSTANT HEATER-INK POLYMER

CROSS-REFERENCE TO RELATED APPLICATION

This application is a continuation of PCT Patent Application No. PCT/KR2015/012614 filed on Nov. 24, 2015, which claims priority to and the benefit of Korean Patent Application No. 10-2015-0095522 filed on Jul. 3, 2015, and the entire disclosures of which are incorporated herein by reference.

TECHNICAL FIELD

The present invention relates to a wet-use plane heater, and particularly, to a wet-use plane heater using a positive temperature coefficient (PTC) constant heater-ink polymer which minimizes leakage current and induced current and has self-temperature control characteristics.

BACKGROUND ART

Recently, development of a new technique for minimizing a leakage current due to wet installation has emerged as research and development of a heating material for energy-saving heating and a heater using the heating material are accelerated.

A wire heater has mainly been used to date as a wet installation type heater for heating. However, since the wire heater is prepared from a heating material such as Ni—Cr and Fe—Ni—Cr, thermal efficiency is low due to line heating. Thus, power consumption is relatively high and there are difficulties in maintenance, for example, the entire heater doesn't heat when a circuit is opened at any point due to a series circuit configuration. Also, due to an overheating phenomenon, such as local heating, e.g., heat collection, the damage to the heater and the risk of fire are high and the safety of the product is not provided.

Furthermore, a carbon-based plane heater has better thermal efficiency than the wire heater, but since conductive particles, such as carbon black, are used as a resistance heat source, a resistance value is significantly changed due to repeated use and, due to the overheating phenomenon, such as local heating, e.g., heat collection, the damage to the heater and the risk of fire are high and the safety of the product is not provided.

In order to secure the safety, a temperature control system, such as an overheat protection sensor, has been provided to the wire heater and plane heater, but the temperature control system causes the overheating phenomenon, such as local heating, e.g., heat collection. The overheating phenomenon mainly occurs from thermal insulation or heat accumulation and overheating, and particularly, since local overheating of the heater damages a finishing material while the temperature of a heat accumulator is rapidly increased, it has been a cause of electrical fires.

In particular, in a case in which limitations of the wire heater, which has currently been installed for wet use, are addressed and the plane heater having relatively better thermal efficiency is used as a heater for wet installation, since the leakage current is more rapidly increased than that of the wire heater, a circuit breaker may be operated.

The reason for this is that a conventional plane heater has mostly been prepared from a polyethylene terephthalate (PET) film for the purpose of electrical insulation and flame retardant and has mainly been used in dry installation. Also, there is a limitation in that the PET film of the plane heater is vulnerable to strong alkalinity of a cement mortar floor in contact therewith during wet installation and to the generation of moisture or condensation due to waterproofing properties caused by interfacial contact in which the PET film of the plane heater has a wider installation floor surface than the wire heater.

A constant heater using a positive temperature coefficient (PTC) constant heater-ink polymer, in which a PET film is used, has been proposed in Korean Patent No. 10-1168906 (Jul. 7, 2012) by the present applicants, the patent gazette discloses solutions to problems, for example, an improvement in polymer PTC characteristics and the stabilization of room-temperature resistance by the adjustment of the amounts of various dopants added, and the patent has already been commercialized and products have exported to the United States.

However, with respect to the patented technique, the polymer PTC constant heater saves energy and is safe from the risk of electrical fires due to self-temperature control characteristics, but there are difficulties in using the heater for wet installation as described above.

Thus, the present invention uses and improves the patented technique developed by the present applicants to propose a completely new wet-use plane heater having self-temperature control characteristics which may minimize a leakage current and may be wet-installed for heating.

DISCLOSURE OF THE INVENTION

Technical Problem

The present invention provides a wet-use plane heater using a positive temperature coefficient (PTC) constant heater-ink polymer, in which a PTC constant heater-ink having self-temperature control characteristics and a structure of the wet-use plane heater for minimizing leakage current and induced current are combined.

Technical Solution

According to an aspect of the present invention, there is provided a wet-use plane constant heater 10 using a positive temperature coefficient (PTC) constant heater-ink polymer with self-temperature control characteristics, in which a PTC element and multi-walled carbon nanotubes (MWNT), as conductive fine particles, are combined, including: a lower laminated portion (A) which includes first/second adhesives 16*a* and 16*b* for laminating a pair of polypropylene (PP) films 15*a* and 15*b* with a polyethylene terephthalate (PET) film 110*a* to minimize a leakage current generated due to moisture permeability and waterproofing properties in the PET film 110*a* having a thin planar shape, heat resistance and insulating properties on which metal electrodes are mounted, a third adhesive 14*a* for lamination of an ester-based nonwoven fabric 13*a* to bond the PP film 15*b*, prevent movement of the metal electrodes, and minimize the leakage current, and a double-sided adhesive tape 12 to which a release paper 11 for attaching the nonwoven fabric to an installation floor surface is attached; and an upper laminated portion (B) which includes first/second adhesives 16*c* and 16*d* for laminating a pair of polypropylene (PP) films 15*c* and 15*d* with a polyethylene terephthalate (PET) film 110*b* to minimize a leakage current generated due to moisture permeability and waterproofing properties in the PET film 110*b* having a thin planar shape, heat resistance and insulating properties on which metal electrodes are mounted, and a third adhesive 14*b* for laminating the PP film 15*d* with an ester-based nonwoven fabric 13*b* configured to improve adhesion with a mortar disposed on a top thereof, wherein the PET film 110*a* and the PP films 15*a* and 15*b*, as insulating films of the lower laminated portion (A) laminated with the first/second adhesives 16*a* and 16*b*, the PET film 110*b* and the PP films 15*c* and 15*d*, as insulating films of the upper laminated portion (B) laminated with the first/second adhesives 16*c* and 16*d*, and the ester-based nonwoven fabrics 13*a* and 13*b* laminated with the third adhesives 14*a* and 14*b* are partially laminated by a dry lamination method using a gravure copper plate 20 and polyurethane including a hardener and then heat-treated to minimize an induced current which is generated from the plane heater due to an increase in contact area with an installation floor when a voltage is applied to the metal electrodes of the constant heater.

The metal electrodes may be copper (Cu) having excellent thermal conductivity and electrical conductivity.

The PET film 110*a* and the PP films 15*a* and 15*b*, as insulating films of the lower laminated portion (A) laminated with the first/second adhesives 16*a* and 16*b*, the PET film 110*b* and the PP films 15*c* and 15*d*, as fabric films of the upper laminated portion (B) laminated with the first/second adhesives 16*c* and 16*d*, and the ester-based nonwoven fabrics 13*a* and 13*b* laminated with the third adhesives 14*a* and 14*b* may be overall laminated by a dry lamination method using the gravure copper plate 20 and polyurethane including a hardener and then heat-treated.

The metal electrodes disposed between the PET film 110*a* and the PET film 110*b* may be mounted in 4 lines when the wet-use plane heater is for AC 200V to 250 V.

The metal electrodes disposed between the PET film 110*a* and the PET film 110*b* may be mounted in 6 lines when the wet-use plane heater is for AC 100V to 150 V.

An adhesive may be coated in a rhombus cell pattern having a predetermined interval to form an air layer 30 for the minimization of the leakage current when using the partial lamination.

An adhesive may be coated in a longitudinal cell pattern having a predetermined interval to improve deformation of an air layer 30 formed for the minimization of the leakage current, ripples of the metal electrodes, and wrinkles and waves on the constant heater 10 when using the partial lamination.

Advantageous Effects

A wet-use plane heater using a positive temperature coefficient (PTC) constant heater-ink polymer, according to an embodiment of the present invention, may have the following effects.

(1) Since an adhesive is coated by a partially laminated copper plate pattern method, the present invention may solve a problem in that a circuit breaker is easily shorted because a leakage current is rapidly increased in comparison to that of a wire heater due to vulnerability of wet installation in which a polyethylene terephthalate (PET) film of a conventional dry-use plane heater is vulnerable to strong alkalinity of a cement mortar floor in contact therewith and to the generation of moisture or condensation due to waterproofing properties caused by interfacial contact in which the PET film has a wide installation floor surface.

(2) Since the present invention uses the PTC constant heater-ink polymer having self-temperature control characteristics in addition to partial lamination between insulating films to enable wet installation and provides a new heater structure in which a double-sided adhesive tape is attached to a nonwoven fabric of a lower laminated portion of the plane heater, power consumption may be saved and the risk of electrical fires may be significantly reduced by the minimization of the leakage current.

(3) Since the heater of the present invention has better flexibility and thermal efficiency than a conventional wet-use wire heater, changes in initial resistance after heating due to the repeated use of the heater may be minimized to obtain more uniform heating characteristics. Thus, stable quality and reliability of the product may not only be secured, but installation per area may also be possible to significantly increase efficiency of installation work.

(4) The present invention provides an advanced 13-layer-bonded-type plane heater in which a lower laminated portion, in which bonding fiber materials having excellent rigidity with flexibility and excellent thermal insulation effect as well as expansion and contraction are synthesized on a PET film as an insulation and fire retardant material and electrodes are formed from a copper foil, and an upper laminated portion formed of a bonding material for protecting the electrodes of the lower laminated portion are separately laminated, and thus, the plane heater of the present invention is very effective in wet installation by overcoming limitations of the conventional dry-use plane heater.

MODE FOR CARRYING OUT THE INVENTION

Figure 1:
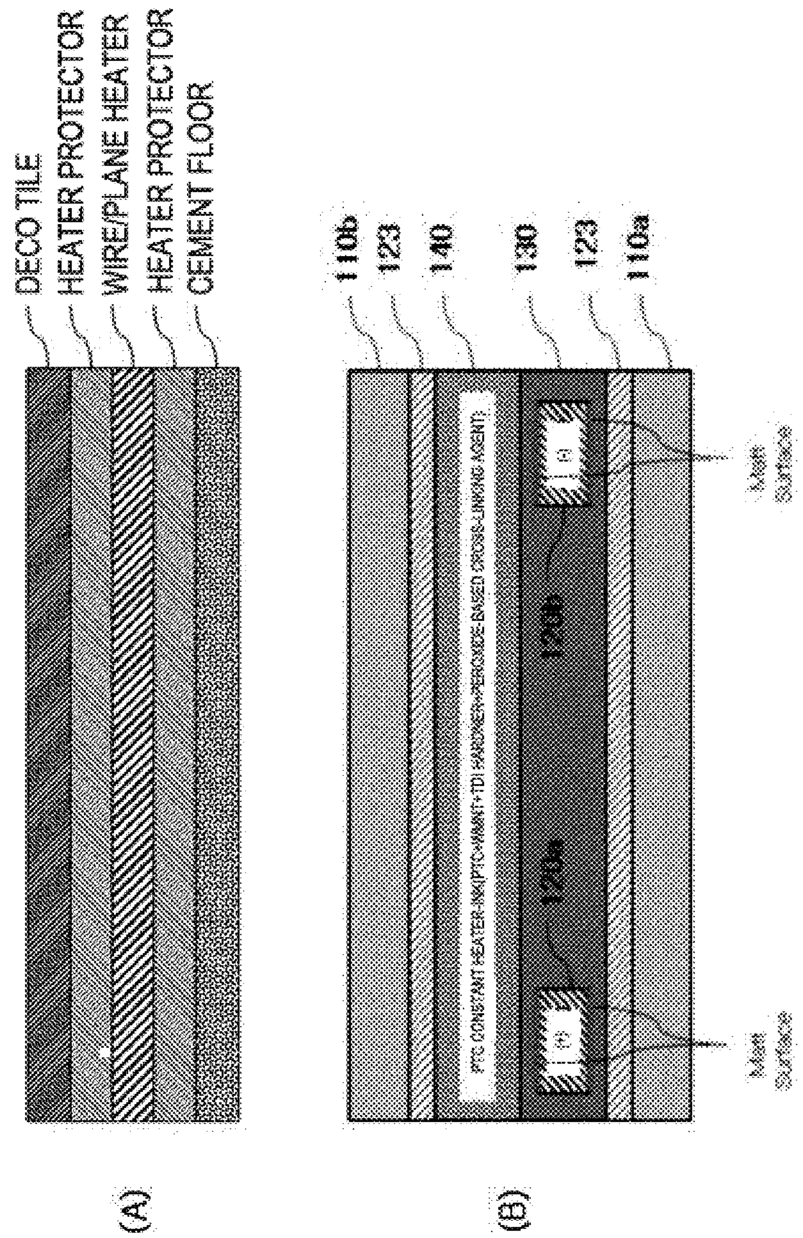
FIG. 1 illustrates a conventional constant heater using a positive temperature coefficient (PTC) constant heater-ink polymer.

Hereinafter, preferred embodiments of the present invention will be described in detail with reference to the accompanying drawings. In the specification, in adding reference numerals to elements throughout the drawings, it is to be noted that like reference numerals refer to like elements even though elements are shown in different drawings. Moreover, in describing the present disclosure, well-known configurations or functions will not be described in detail since they may unnecessarily obscure the gist of the present disclosure.

Figure 2:
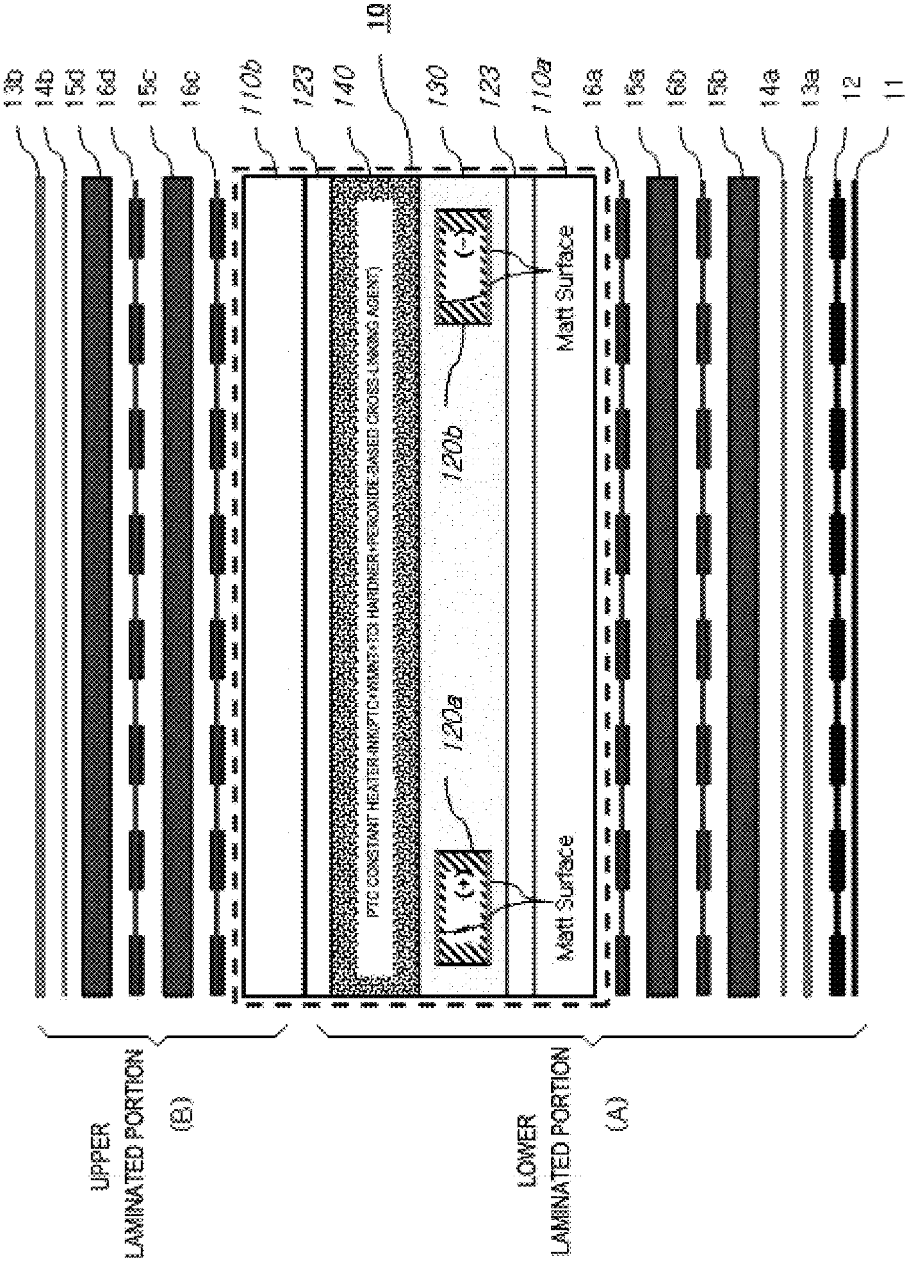
FIG. 2 illustrates an overall configuration of a wet-use plane heater using a PTC constant heater-ink polymer according to an embodiment of the present invention.

Referring to FIG. 2, a technical configuration of a wet-use plane heater using a positive temperature coefficient (PTC) constant heater-ink polymer, according to a preferred embodiment of the present invention, is broadly composed of a lower laminated portion (A) and an upper laminated portion (B), in which polyethylene terephthalate (PET) films and polypropylene (PP) films, as fabric films, as well as ester-based nonwoven fabrics are partially laminated or overall laminated with a constant heater 10 using a PTC constant heater-ink polymer by a dry lamination method using a gravure copper plate 20 and then heat-treated.

First, the constant heater 10 using a PTC constant heater-ink polymer, which has been patented by the present applicants, has a thin planar shape and heat resistance as well as insulating properties and is manufactured with predetermined specifications, wherein the constant heater 10 includes a pair of PET films 110*a* and 110*b* acting as top and bottom covers of the constant heater; a pair of metal electrodes 120*a* and 120*b,* which are subjected to a matt treatment and a thin film coating treatment on edges of the lower PET film 110*a,* selected from any one of nickel (Ni), silver (Ag), tin (Sn), and zinc (Zn) and attached by an adhesive 123 in which a modified urethane-based adhesive 121 containing an ester-based compound and a toluene diisocyanate (TDI)-based hardener 122 are mixed; an ester-based nonwoven fabric 130 stably placed on an entire surface of the lower PET film 110*a* to prevent cracks occurred along boundary portions between the lower PET film 110*a* and the pair of metal electrodes 120*a* and 120*b* and to prevent movement of the pair of metal electrodes; and a PTC constant heater-ink polymer 140 in which a conductive polymer composition, in which a dry coating layer is formed between the metal electrodes 120*a* and 120*b* and the ester-based nonwoven fabric 130 to enhance adhesion and a PTC element 141, as a semiconductor material having positive temperature coefficient characteristics, and multi-walled carbon nanotubes 142 (MWCNT or MWNT) are combined to have conductive properties and self-temperature control characteristics, the TDI-based hardener 122, and a peroxide-based cross-linking agent are mixed (see Korean Patent No. 10-1168906).

Herein, polyethylene terephthalate (PET) is one of plastic molding materials, wherein since a PET molding material reinforced with glass fibers has good physical properties comparable to those of a thermosetting resin, the PET molding material is use in electronic components, automotive electronic components, and heat appliances, and has a considerably high heat distortion temperature of about 240° C. because mechanical strength or dimensional accuracy is improved and simultaneously, heat resistance is significantly improved due to the glass fiber reinforcement. Also, since PET is highly non-toxic, odorless, and transparent, the PET is currently being widely used as a food container.

Referring to FIG. 2, the lower laminated portion (A) according to an embodiment of the present invention includes the polyethylene terephthalate (PET) film 110*a,* the adhesive 123, and the PTC constant heater-ink polymer 140 of the constant heater 10 using a PTC constant heater-ink polymer, which saves energy and is safe from the risk of electrical fires due to the self-temperature control characteristics, and minimizes a leakage current which is generated due to moisture permeability and waterproofing properties caused by an increase in a bottom surface area (or facing area) of the PET film and PP film, as insulating films, during wet installation in which the constant heater 10 is installed in a concrete floor with a mortar.

Also, in order to realize a wet-installable plane heater by primarily minimizing an induced current of a circuit breaker which cuts off a voltage by detecting the leakage current, a pair of PP films 15*a* and 15*b,* first/second adhesives 16*a* and 16*b,* a nonwoven fabric 13*a,* a third adhesive 14*a,* and a double-sided adhesive tape 12 having a release paper 11 attached thereto are provided.

In other words, in a case in which the polyethylene terephthalate (PET) film 110*a* having a thin planar shape, heat resistance and insulating properties, on which the metal electrodes, such as copper (Cu), having excellent thermal conductivity and electrical conductivity are mounted, is in contact with a concrete floor surface area, there is a need to minimize the leakage current generated due to the moisture permeability and waterproofing properties of the PET film. In order to minimize the leakage current, the first/second adhesives 16*a* and 16*b* are used to partially laminate or overall laminate the pair of PP films 15*a* and 15*b* with the PET film. Also, the third adhesive 14*a* for the lamination of the ester-based nonwoven fabric 13*a* is used to bond the PP film 15*b,* prevent the movement of the metal electrodes, and minimize the leakage current. In addition, in order to easily attach the nonwoven fabric to the installation floor surface of concrete or the like, the double-sided adhesive tape 12 having the release paper 11 attached thereto is provided to complete the single integrated lower laminated portion (A).

Referring to FIG. 2, the upper laminated portion (B) has a configuration in which the upper laminated portion (B) is finally laminated with the lower laminated portion (A) to form a single wet-use plane heater, wherein the PET film 110*b* and the adhesive 123 of the constant heater 10 using a PTC constant heater-ink polymer, which saves energy and is safe from the risk of electrical fires due to the self-temperature control characteristics, are included, and, in order to enable wet installation by secondarily minimizing a leakage current generated due to moisture permeability and waterproofing properties according to an increase in the bottom surface area of the PET film and PP film, as fabric films, caused by a mortar as a finishing material after the installation of the wet-use plane heater and induced current of the circuit breaker detecting the leakage current and to increase adhesion between the mortar and a nonwoven fabric, a pair of PP films 15*c* and 15*d,* first/second adhesives 16*c* and 16*d,* a nonwoven fabric 13*b,* and a third adhesive 14*b* are provided to complete the single integrated upper laminated portion (B).

In other words, in a case in which the polyethylene terephthalate (PET) film 110*b* having a thin planar shape, heat resistance and insulating properties, on which the metal electrodes, such as copper (Cu), having excellent thermal conductivity and electrical conductivity are mounted, is in contact with the mortar as a top finishing material, the first/second adhesives 16*c* and 16*d* are used to partially laminate or overall laminate the pair of polypropylene (PP) films 15*c* and 15*d* having waterproofing properties with the PET film in order to minimize the leakage current from the PET film. Also, the third adhesive 14*b* for the lamination of the ester-based nonwoven fabric 13*b* configured to improve adhesion between the PP film 15*d* and the mortar disposed on the top is provided to complete the single integrated upper laminated portion (B).

Herein, the polypropylene (PP) is prepared by polymerization of propylene obtained from petroleum with a Ziegler-Natta catalyst, wherein the PP is prepared by the same method as a low-pressure polyethylene process. Polypropylene is a polymer, in which a methyl ($CH_3$) group is attached to every other carbon atom of a polyethylene molecular chain, and is in the form in which short branches are regularly attached thereto. A polypropylene film has higher transparency than a polyethylene film and is a little hard. The polypropylene film has a specific gravity of 0.92 which is the lightest of all plastics, its melting temperature is high ranging from 135° C. to 160° C., and application areas are wide.

Also, according to an embodiment of the present invention, the PET film 110*a* and the PP films 15*a* and 15*b*, as the fabric films of the lower laminated portion (A) laminated with the first/second adhesives 16*a* and 16*b*, the PET film 110*b* and the PP films 15*c* and 15*d*, as the fabric films of the upper laminated portion (B) laminated with the first/second adhesives 16*c* and 16*d*, and the ester-based nonwoven fabrics 13*a* and 13*b* laminated with the third adhesives 14*a* and 14*b* are partially laminated by the dry lamination method using the gravure copper plate 20 and polyurethane including a hardener and then heat-treated to minimize the induced current generated from the plane heater due to an increase in contact area with the installation floor when a voltage is applied to the metal electrodes of the constant heater.

Furthermore, a wet-use plane heater according to another embodiment of the present invention is characterized in that the PET film 110*a* and the PP films 15*a* and 15*b*, as the fabric films of the lower laminated portion (A) laminated with the first/second adhesives 16*a* and 16*b*, the PET film 110*b* and the PP films 15*c* and 15*d*, as the fabric films of the upper laminated portion (B) laminated with the first/second adhesives 16*c* and 16*d*, and the ester-based nonwoven fabrics 13*a* and 13*b* laminated with the third adhesives 14*a* and 14*b* are overall laminated by the dry lamination method using the gravure copper plate 20 and polyurethane including a hardener and then heat-treated.

Herein, polyurethane (PU) used as the third adhesives 14*a* and 14*b* is a synthetic resinous·fibrous·elastic compound belonging to the family of organic polymers made by the reaction of a two-functional group compound, like diisocyanate (organic compound including two —NCO functional groups) and glycol, wherein the best-known polyurethane is an elastic foam used in tapestry and mattress and a solid foam used in a light structural material such as a core of an airplane wing. The polyurethane having a foam structure is obtained by a reaction of an organic compound having a carboxyl group, such as polyester, with diisocyanate, and carbon dioxide bubbles generated by this reaction are dispersed over the entire product.

Figure 3:
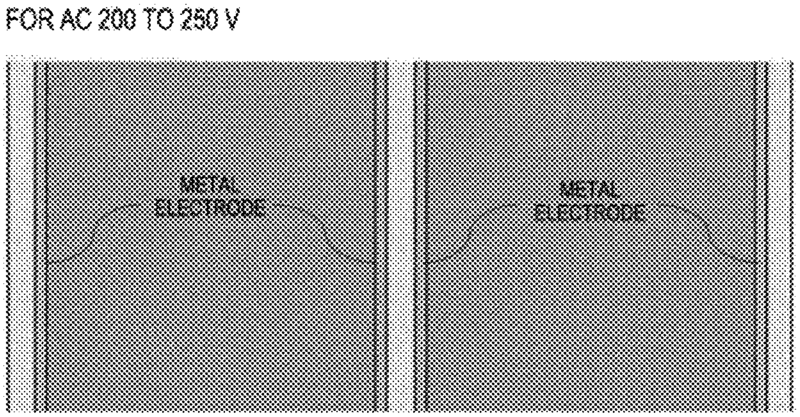
FIG. 3 illustrates the arrangement of metal electrodes according to an applied voltage in FIG. 2.

Also, referring to FIG. 3, a wet-use plane heater according to another embodiment of the present invention is allowed to provide a heating effect as a wet-use plane heater suitable to the designed maximum allowable voltage and current by arranging the metal electrodes, which are mounted between the PET film 110*a* and the PET film 110*b*, in 4 lines when the heater is for AC 200V to 250 V.

Figure 4:
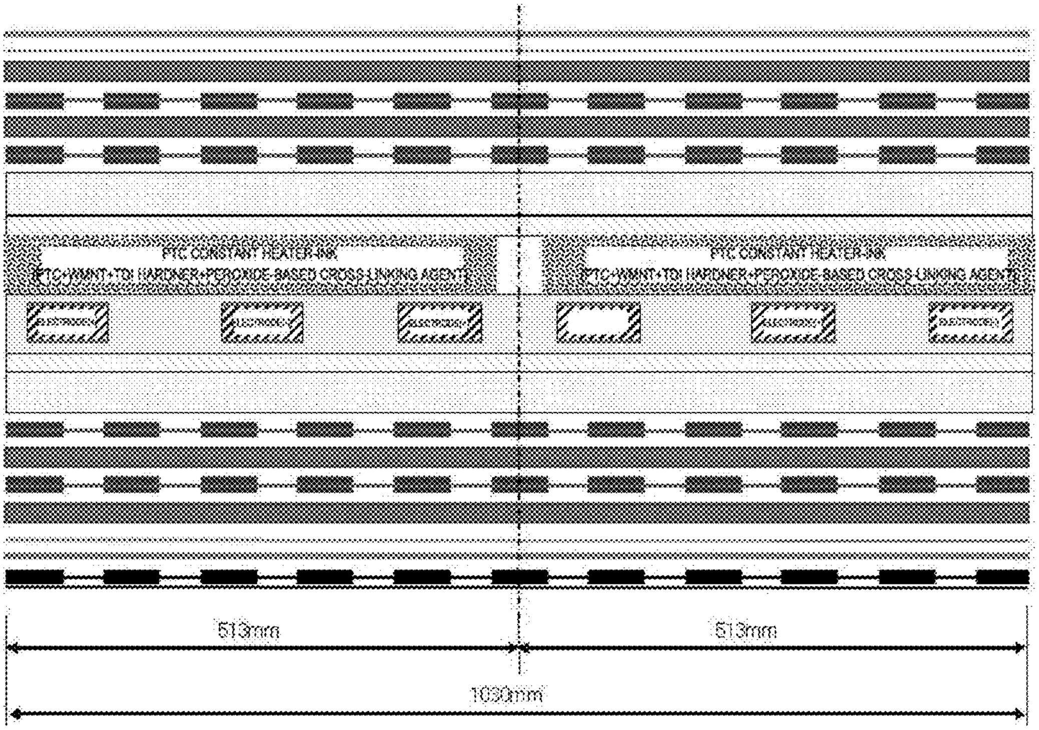
FIG. 4 illustrates the arrangement of metal electrodes of a wet-use plane heater using a PTC constant heater-ink polymer according to another embodiment of the present invention.
Figure 5:
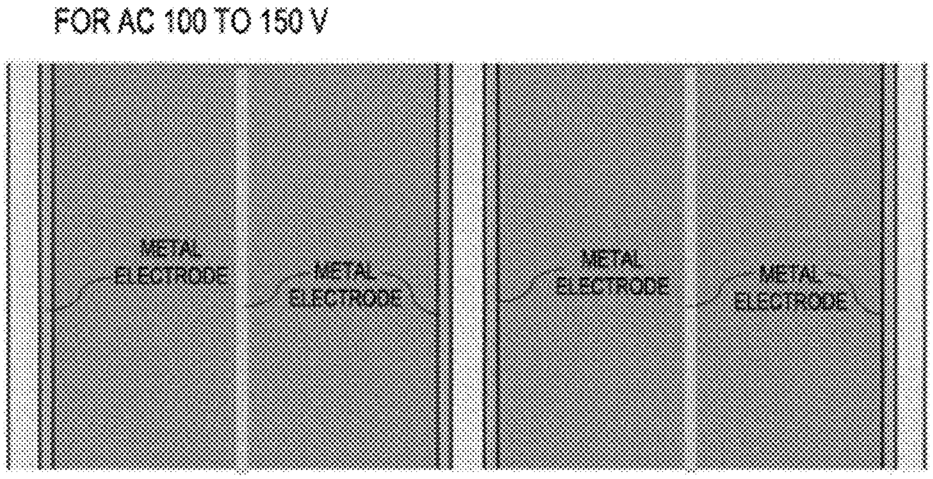
FIG. 5 illustrates the arrangement of the metal electrodes according to an applied voltage in FIG. 4.

Furthermore, referring to FIGS. 4 and 5, the wet-use plane heater according to another embodiment of the present invention is allowed to provide a heating effect as a wet-use plane heater suitable to the designed maximum allowable voltage and current by arranging the metal electrodes, which are mounted between the PET film 110*a* and the PET film 110*b*, in 6 lines when the heater is for AC 100V to 150 V.

Figure 6:
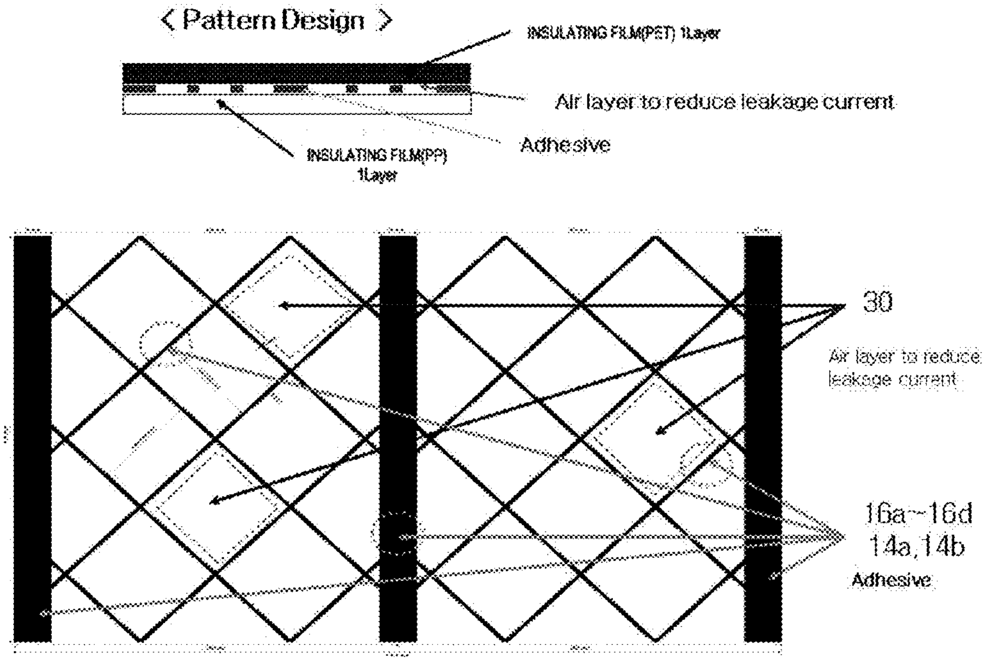
FIG. 6 illustrates partial lamination of a wet-use plane heater using a PTC constant heater-ink polymer in a rhombus cell pattern according to a preferred embodiment of the present invention.
Figure 7:
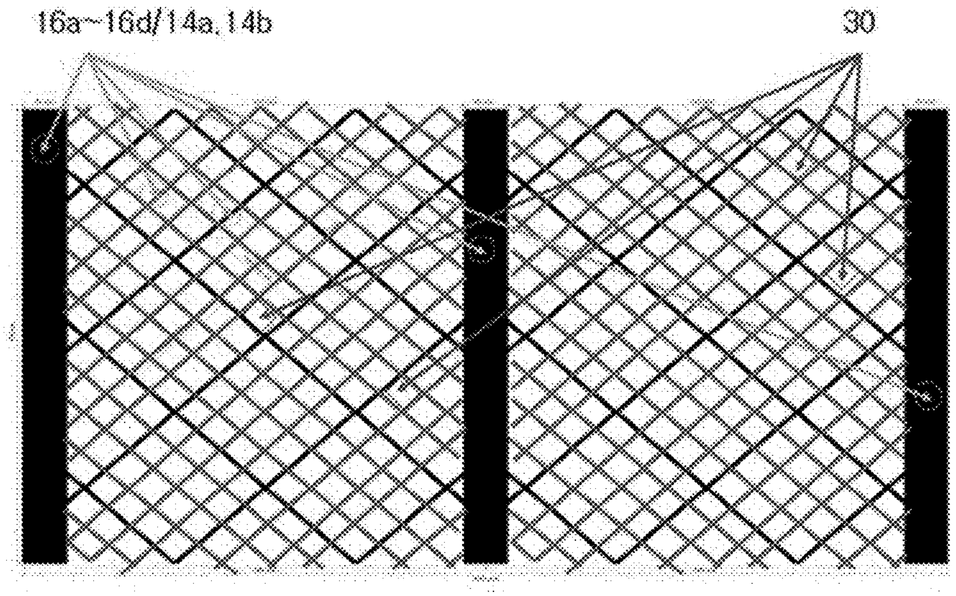
FIG. 7 illustrates partial lamination in a rhombus cell pattern in which the size of a rhombus cell is different from that of FIG. 6.

Referring to FIGS. 6 and 7, in the wet-use plane heater according to another embodiment of the present invention, an adhesive is coated in a rhombus cell pattern having a predetermined interval so as to form an air layer 30 to minimize the leakage current when using the partial lamination.

The design of the rhombus cell has a structural advantage in that water generated due to humidity does not spread out into another cell even if a leakage occurs in any one cell by forming a rhombic air layer through the partial lamination of the PET film, as an insulating film, and the PP film or the PP film and the PP film.

Also, since the size of the rhombus cell of FIG. may be formed to be smaller than that of FIG. 6, lamination strength of the wet-use plane heater may be improved and the large-area diffusion of water may be prevented.

Figure 8:
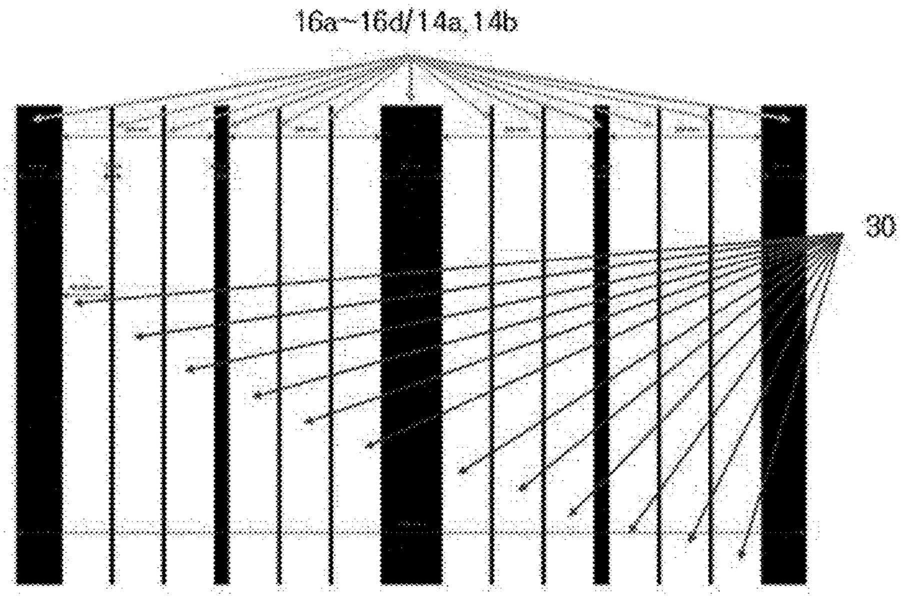
FIG. 8 illustrates partial lamination of a wet-use plane heater using a PTC constant heater-ink polymer in a longitudinal cell pattern according to a preferred embodiment of the present invention.

Referring to FIG. 8, in a wet-use plane heater according to another embodiment of the present invention, an adhesive is coated in a longitudinal cell pattern having a predetermined interval so as to improve the deformation of an air layer 30 for minimizing the leakage current, ripples of the metal electrodes, and wrinkles and waves on the constant heater when using the partial lamination.

The design of the longitudinal cell is to improve the rupture of the air layer occurred during the partial lamination of the rhombus cells in a manufacturing process of the constant heater, the ripples of the metal electrodes, and the wrinkles and waves on the constant heater by forming a longitudinal air layer through the partial lamination of the PET film, as an insulating film, and the PP film or the PP film and the PP film.

Thus, a principle of minimizing the leakage current by the air layer between the insulating films formed by the partial lamination according to the embodiment of the present invention is as follows. Since the PET film, as an insulating film, and the PP film have dielectric properties during the application of alternating current to the constant heater, a leakage current occurs in which a small amount of current flows to the ground through the insulating film. In order to prevent the leakage current, the occurrence of the leakage current may be minimized by forming the air layer through the partial lamination of the PET film, as an insulating film, and the PP film or the PP film and the PP film. The reason for this is that there is a case in which the leakage current may occur through the insulating film while the arrangement of electric dipoles of molecules constituting the insulating film of the constant heater is changed according to a frequency (cycle) of the alternating current during the application of the alternating current. In a case in which the partial lamination is performed in a rhombus cell pattern or a longitudinal cell pattern, the air layer (permittivity of air is similar to that of vacuum) formed by the partially laminated cells somewhat blocks moisture, such as humidity, generated due to the moisture permeability and waterproofing properties of the insulating film having a large facing area with respect to the floor during wet installation.

Thus, the wet-use plane heater using a PTC constant heater-ink polymer according to the preferred embodiment of the present invention is characterized in that since the above-described constant heater using a PTC constant heater-ink polymer is mainly used as a dry-use plane heater, a completely new wet-installable plane heater is realized by using the above-described constant heater.

Figure 9:
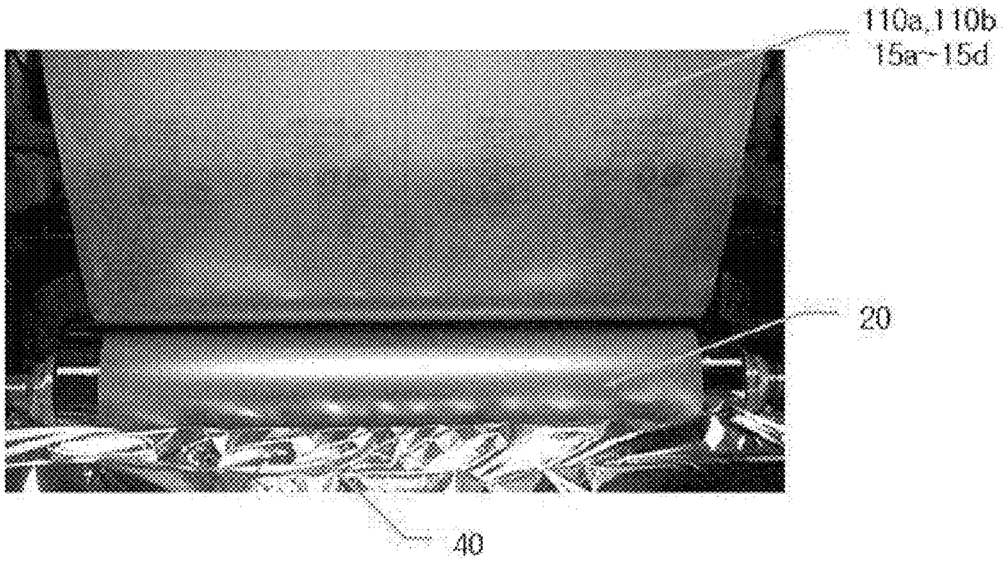
FIGS. 9 and 10 illustrate a photograph of a gravure copper plate for the partial lamination of a wet-use plane heater using a PTC constant heater-ink polymer according to a preferred embodiment of the present invention and a photograph after dry lamination and partial lamination, respectively.
Figure 10:
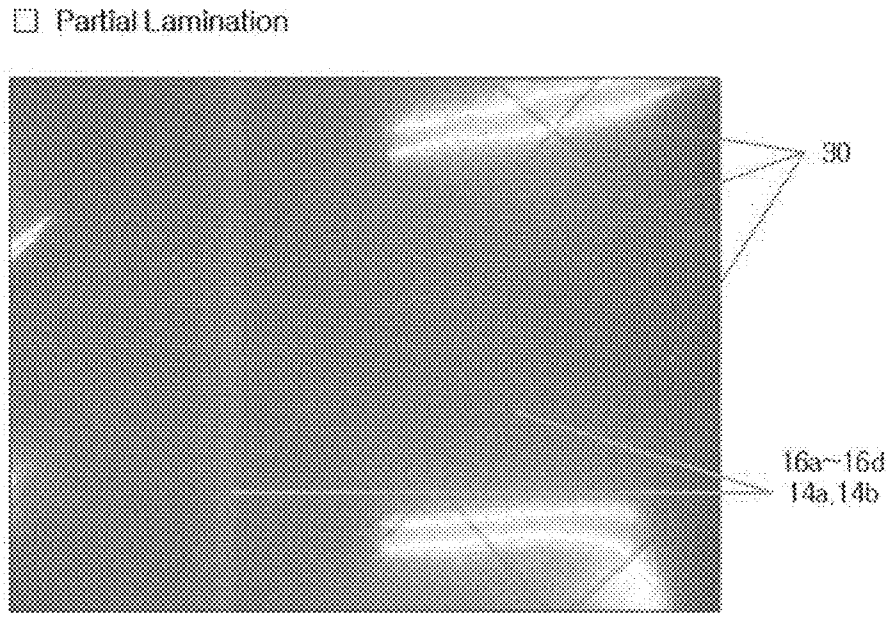

FIGS. 9 and 10 illustrate a photograph of a dry lamination process using the gravure copper plate 20 and an adhesive container 40 for the partial lamination of the PET films 110*a* and 110*b*, as insulating films, of the wet-use plane heater using a PTC constant heater-ink polymer according to the preferred embodiment of the present invention and the PP films 15*a* to 15*d* reinforced to minimize the leakage current and induced current with respect to the PET films, and a photograph after the completion of the partial lamination, respectively.

The above description is merely intended to illustratively describe the technical spirit of the present invention, and various changes and modifications can be made by those skilled in the art without departing from the essential features of the present invention. Therefore, the embodiments disclosed in the present invention are not intended to limit the technical spirit of the present invention, but are intended to describe the present invention. The scope of the spirit of the invention is not limited by these embodiments. The scope of the present invention should be defined by the accompanying claims and all technical spirits falling within the equivalent scope thereof should be interpreted as being included in the scope of the present invention.

The invention claimed is:

1. A wet-use plane constant heater using a positive temperature coefficient (PTC) constant heater-ink polymer with self-temperature control characteristics in which a PTC element and multi-walled carbon nanotubes (MWNT), as conductive fine particles, are combined, the wet-use plane heater comprising:

a lower laminated portion (A) which includes first and second adhesives for laminating a pair of polypropylene (PP) films with a polyethylene terephthalate (PET) film to minimize a leakage current generated due to moisture permeability and waterproofing properties in the PET film having a thin planar shape, heat resistance and insulating properties on which metal electrodes are mounted, a third adhesive for lamination of an ester-based nonwoven fabric to bond the PP film, prevent movement of the metal electrodes, and minimize the leakage current, and a double-sided adhesive tape to which a release paper for attaching the nonwoven fabric to an installation floor surface is attached; and an upper laminated portion (B) which includes first and second adhesives for laminating a pair of polypropylene (PP) films with a polyethylene terephthalate (PET) film to minimize a leakage current generated due to moisture permeability and waterproofing properties in the PET film having a thin planar shape, heat resistance and insulating properties on which metal electrodes are mounted, and a third adhesive for laminating the PP film with an ester-based nonwoven fabric configured to improve adhesion with a mortar disposed on a top thereof, wherein the PET film and the PP films, as insulating films of the lower laminated portion (A) laminated with the first and second adhesives, the PET film and the PP films, as insulating films of the upper laminated portion (B) laminated with the first and second adhesives, and the ester-based nonwoven fabrics laminated with the third adhesives are partially laminated by a dry lamination method using a gravure copper plate and polyurethane including a hardener and heat-treated to minimize an induced current which is generated from the plane heater due to an increase in contact area with an installation floor when a voltage is applied to the metal electrodes of the constant heater.

2. The wet-use plane heater using a PTC constant heater-ink polymer of claim 1, wherein the metal electrodes are copper (Cu) having excellent thermal conductivity and electrical conductivity.

3. The wet-use plane heater using a PTC constant heater-ink polymer of claim 1, wherein the PET film and the PP films, as insulating films of the lower laminated portion (A) laminated with the first and second adhesives, the PET film and the PP films, as fabric films of the upper laminated portion (B) laminated with the first and second adhesives, and the ester-based nonwoven fabrics laminated with the third adhesives are overall laminated by a dry lamination method using the gravure copper plate and polyurethane including a hardener and heat-treated.

4. The wet-use plane heater using a PTC constant heater-ink polymer of claim 1, wherein the metal electrodes disposed between the PET film and the PET film are mounted in 4 lines when the wet-use plane heater is for AC 200V to 250 V.

5. The wet-use plane heater using a PTC constant heater-ink polymer of claim 1, wherein the metal electrodes disposed between the PET film and the PET film are mounted in 6 lines when the wet-use plane heater is for AC 100V to 150 V.

6. The wet-use plane heater using a PTC constant heater-ink polymer of claim 1, wherein an adhesive is coated in a rhombus cell pattern having a predetermined interval to form an air layer for the minimization of the leakage current when using the partial lamination.

7. The wet-use plane heater using a PTC constant heater-ink polymer of claim 1, wherein an adhesive is coated in a longitudinal cell pattern having a predetermined interval to improve deformation of an air layer formed for the minimization of the leakage current, ripples of the metal electrodes, and wrinkles and waves on the constant heater when using the partial lamination.

* * * * *